2,783,237

BIS-DIALKYLAMINOALKYLENE BIS-POLYCYCLIC AMMONIUM SALTS

Chester John Cavallito and Allan Poe Gray, Decatur, Ill., assignors to Irwin, Neisler and Company, Decatur, Ill., a corporation of Illinois No Drawing. Application October 12, 1953, Serial No. 385,676

6 Claims. (Cl. 260—293)

This invention relates to ammonium salts of substituted alkylenediamines and is more particularly concerned with polycyclic ammonium salts of alkylenediamines having the following structural formula:

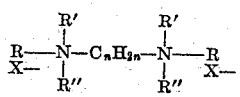

wherein R is a fluorene radical, a fluorenylalkyl radical, or a carbazylalkyl radical, wherein R' and R" are hydrogen or a lower-alkyl group containing up to six carbon atoms, wherein $n$ is an integer from three to twelve, inclusive, and wherein X is an anion residue of an ammonium forming material. In the above formula, the said Rs, and R's and R"s may be the same or different and the R' and R" of the same nitrogen atom may be joined together to form a heterocyclic ring.

The compounds of the present invention have shown therapeutic activity as curarimetic agents in preliminary pharmacological testing.

Synthesis of the compounds of the present invention may be accomplished by utilizing two general procedures, depending upon the particular salt desired. The first procedure contemplates that a substituted alkylenediamine having the formula:

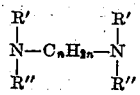

wherein R', R" and $n$ have the hereinbefore assigned values, will be reacted with a suitable polycyclic salt-forming material having as its organic portion a material selected from the group consisting of fluorene, fluorenylalkyl, and carbazylalkyl. Representative substituted diaminoalkylene materials which are suitable include, for example, 1,6 - bis-(dimethylamino)-hexane, 1,6 - bis-(piperidino)hexane, 1,10-bis-(dimethylamino)-decane, 1,10-bis-(diethylamino)decane, 1,4 - bis - (dimethylamino)butane, 1,3-bis-(dihexylamino)propane, 1,3-bis-(dipentylamino)-butane, 1,3-bis-(methylethylamino)propane, 1,7-bis-(dipentylamino)heptane, 1,8 - bis-(dibutylamino)octane, 1,5-bis-(dipropylamino)pentane, 1,6 - bis - (piperidino)undecane, 1,12-bis-(propylbutyl)dodecane, 1,3-bis-(methylethylamino)-butane, 1,6-bis - (methylamino)hexane, 1,7-bis-(dipropylamino)-nonane, et cetera.

Representative polycyclic salt-forming materials which are suitable include, for example, 9-bromofluorene, 9-(2'-chloroethyl)-fluorene, 9-(6'-bromohexyl)-fluorene, 2-(1'-chloromethyl)-fluorene, 3-(3'-chloropropyl)-fluorene, 9-(2'-chloroethyl)-carbazole, 9-(3'-bromobutyl)-carbazole, 9-(5'-iodopentyl)-carbazole, 9 - (6'-bromohexyl) - carbazole, et cetera. The reaction is usually accomplished by heating the reactants together in a suitable solvent, for example, acetonitrile, alcohols such as methanol, ethanol, propanol, butanol, ethers such as dipropyl ether, dibtuyl ether, dipentyl ether, dihexyl ether, hydrocarbons such as petroleum ether, hexane, pentane, heptane, octane and chlorinated solvents, such as trichloroethylene, perchloroethylene, et cetera, that is, a solvent which is inert to the reactants and reaction products. Preferably, two or more moles of the polycyclic salt-forming material are used for each mole of alkylenediamine. While a partial reaction usually occurs upon contact of the reactants, it is desirable to heat the reaction mixture at temperatures above about fifty degrees centigrade to cause as complete reaction as possible. Preferably, temperatures between about 90 and 140 degrees centigrade are employed, depending upon the reactants and solvent employed. The reaction time will be dependent upon the temperature employed, the higher the temperature, the shorter the reaction time. Generally speaking, the reaction time will be less than 24 hours.

The second method for synthesizing the compounds of the present invention contemplates that an alkylene dihalide will be reacted with an appropriate dialkylamino-substituted-polycyclic radical-containing material. Representative alkylene dihalides which are suitable include, for example, 1,3-dibromopropane, 1,4-diiodobutane, 2,4-dibromohexane, 1,6 - dibromohexane, 1,10 - dibromodecane, 2,4-dichlorohexane, 1,4-dichlorobutane, et cetera. Representative dialkylamino-polycyclic materials which are suitable include, for example, 9-(dimethylamino)fluorene, 9 - (diethylamine)fluorene, 2 - (dimethylamino)fluorene, 9 - (dimethylaminoethyl)fluorene, 9 - (diethylaminoethyl)-carbazole, 9-(diisopropylaminoethyl)carbazole, et cetera. This reaction is conducted in a manner similar to that described for the first method and the conditions specified there are applicable here, excepting that a longer reaction period may be required to complete the reaction.

Separation of the reaction product is accomplished by conventional procedure, usually by adding ether to precipitate the product, collecting the product and recrystallizing from a suitable solvent material. The products of the present invention are white, crystalline, water-soluble solids.

The following examples are given to illustrate procedures for preparing compounds of the present invention, but are not to be construed as limiting.

Example 1

To a solution of 13.2 grams (0.054 mole) of 9-bromofluorene in 200 milliliters of acetonitrile was added 3.1 grams (0.018 mole) of 1,6-bis-(dimethylamino)hexane. Heat was evolved and solid began to precipitate immediately. After the initial reaction had subsided, the mixture was refluxed for three and one-half hours on a steam bath. The solid was collected and recrystallized three times from propanol to give 10.66 grams (89 percent of the theoretical yield based on alkylenediamine) of hexamethylene bis-(9 - fluorenyldimethylammonium)-dibromide, as white crystals melting at 188–189 degrees centigrade.

*Analysis.*—Calculated: C, 65.26; H, 6.39; Br, 24.12. Found: C, 64.99; H, 6.59; Br, 23.82.

Example 2

A solution of 3.68 grams (0.015 mole) of 9-bromofluorene and 1.14 grams (0.005 mole) of 1,6-bis-(diethylamino)-hexane in fifty milliliters of acetonitrile was allowed to stand at room temperature for 48 hours. The solid precipitate that had formed was collected and recrystallized twice from ethanol and ethyl acetate to give 2.43 grams (67.2 percent of the theoretical yield) of hexamethylene bis - (9 - fluorenyl-diethylammonium)-dibromide (hemihydrate), shrinking at 204 degrees centigrade and melting at 243–245 degrees centigrade with evolution of gas.

*Analysis.*—Calculated: C, 66.03; H, 7.06; N, 3.84; Br, 22.24; H₂O, 1.23. Found: C, 66.96, 66.05; H, 6.69, 6.96; N, 3.63; Br, 21.96, 22.14; H₂O, 1.58.

Example 3

By refluxing a solution of 7.35 grams (0.03 mole) of 9-bromofluorene and 2.52 grams (0.01 mole) of 1,6-bis-(piperidino)hexane in fifty milliliters of ethanol for two hours, hexamethylene bis-(9-fluorenylpiperidinium)dibromide is obtained.

Example 4

In a manner similar to that of Example 1, 9-bromofluorene was reacted with 1,10-bis-(dimethylamino)-decane to give decamethylene bis-(9-fluorenyldimethylammonium)dibromide, melting with gas evolution at 156 degrees centigrade.

*Analysis.*—Calculated: Br, 22.24. Found: 21.59.

Example 5

In a manner similar to that of Example 1, 9-bromofluorene was reacted with 1,10-bis-(diethylamino)decane to give decamethylene bis-(9-fluorenyldiethylammonium)dibromide, melting at 171–172 degrees centigrade.

Example 6

To prepare tetramethylene bis-(9-fluorenyldimethylammonium)-dibromide, 9-dimethylaminofluorene is refluxed for five hours with 1,4-dibromobutane in acetonitrile solution.

Example 7

To a solution of 5.17 grams (0.022 mole) of 9-bromofluorene in fifty milliliters of acetonitrile was added 1.44 grams (0.01 mole) of 1,6-bis-(methylamino)hexane. The solution became warm and a precipitate began forming immediately. After refluxing the reaction mixture for two hours, the solid was collected and twice recrystallized from ethanol and water to give 0.96 gram of 1,6-bis-(N-methyl-9-fluorenylamino)-hexane dihydrobromide, which darkened at 237 degrees centigrade and melted at 245–247 degrees centigrade.

*Analysis.*—Calculated: C, 64.36; H, 6.04; Br, 25.19. Found: C, 64.16; H, 6.24; Br, 24.75.

Example 8

A mixture of 4.18 grams (0.02 mole) of 2-dimethylaminofluorene and 1.22 grams (0.005 mole) of 1,6-dibromohexane was heated at 115 degrees centigrade for 24 hours, after which time ten milliliters of dry dioxane was added and the mixture refluxed for an additional 37 hours. The solid was filtered off, washed with hot acetonitrile and twice recrystallized from propanol to give 0.45 gram of hexamethylene bis-(2-fluorenyldimethylammonium)dibromide, softening at 208 degrees centigrade, melting at 220–222 degrees centigrade.

*Analysis.*—Calculated: C, 65.26; H, 6.39. Found: C, 65.65; H, 6.51.

Example 9

An acetonitrile solution of 5.0 grams (0.021 mole) of 9-(dimethylaminoethyl)fluorene and 1.71 grams (0.007 mole) of hexamethylene dibromide was refluxed for 24 hours. The solid that had formed was collected and the mother liquor diluted with ether to yield additional precipitate. The combined precipitates (5.8 grams) were refluxed in acetonitrile for 24 hours more with 2.5 grams added 9-(dimethylaminoethyl)-fluorene. Ether was added to the solution to precipitate 4.1 grams (82 percent of the theoretical yield) of hexamethylene bis-(9-fluorenylethyl-dimethylammonium)dibromide (+1.5 H₂O) which melted with decomposition at 95 degrees centigrade.

*Analysis.*— Calculated: C, 64.42; H, 7.18; Br, 21.43; N, 3.75; H₂O, 3.62. Found: C, 64.18; H, 7.04; Br, 21.72; N, 4.31; H₂O, 4.30.

Example 10

A solution of 6.59 grams (0.0248 mole) of 9-(diethylaminoethyl)-fluorene and 1.73 grams (0.0071 mole) of 1,6-dibromohexane in 25 milliliters of acetonitrile was refluxed for 72 hours. The cooled solution was diluted with ether to precipitate an oily solid. This was precipitated from ethanol with ether several times. Hexamethylene bis-(9-fluorenylethyldiethylammonium)dibromide (+1.5 H₂O) was obtained in 3.32 grams yield as a hygroscopic solid after drying in the desiccator in vacuo over P₂O₅.

*Analysis.*—Calculated: C, 65.91; H, 7.67; H₂O, 3.37. Found: C, 65.99; H, 7.92; H₂O, 3.90.

Example 11

In a manner similar to that of Example 9, 9-(dimethylaminoethyl)carbazole was reacted with 1,6-dibromohexane to give hexamethylene bis-(9-carbazylethyldimethylammonium) dibromide, which melted at 172–175 degrees centigrade.

*Analysis.*—Calculated: C, 63.32; H, 6.73; Br, 22.18. Found: C, 62.92; H, 6.83; Br, 22.20.

Example 12

In a manner similar to that of Example 10, 9-(diethylaminoethyl)carbazole was reacted with 1,6-dibromohexane in ethanol solution to give hexamethylene bis-(9-carbazylethyldiethylammonium)dibromide. After drying, this product melted at 193–195 degrees centigrade with evolution of gas.

*Analysis.*—Calculated: Br, 20.58. Found: Br, 20.31.

Various modifications may be made in the products and method of the present invention without departing from the spirit or scope thereof and it is to be understood that we limit ourselves only as defined in the appended claims.

We claim:

1. A compound having the formula:

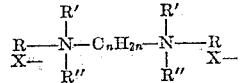

wherein R is selected from the group consisting of carbazylalkyl, fluorenyl and fluorenylalkyl, R' and R" are selected from the group consisting of hydrogen and lower-alkyl containing up to six carbon atoms and wherein R' and R" are joined together to form a piperidino ring n is an integer from three to twelve, inclusive, and X is an anion.

2. Hexamethylene bis-(9-fluorenyldimethylammonium)dibromide.
3. Hexamethylene bis-(9-fluorenyldiethylammonium)-dibromide.
4. Hexamethylene bis-(9-fluorenylpiperidinium)dibromide.
5. Decamethylene bis-(9-fluorenyldimethylammonium)dibromide.
6. Decamethylene bis-(9-fluorenyldiethylammonium)-dibromide.

References Cited in the file of this patent

UNITED STATES PATENTS

| | | |
|---|---|---|
| 2,461,038 | Cusic | Feb. 8, 1949 |
| 2,480,355 | Charpentier | Aug. 30, 1949 |
| 2,687,414 | Cusic | Aug. 24, 1954 |

FOREIGN PATENTS

| | | |
|---|---|---|
| 618,034 | Great Britain | Feb. 15, 1949 |

OTHER REFERENCES

Issekutz: "Arch. Exptl. Path. u Pharmakol," vol. 215 (1952), pp. 283–84.

Cavallito et al.: "J. Am. Chem. Soc.," vol. 77, 1954, pp. 1862–65.